April 2, 1963
H. SCHANZ
3,083,694
FLUID PRESSURE SERVOMOTOR
Filed Feb. 18, 1959
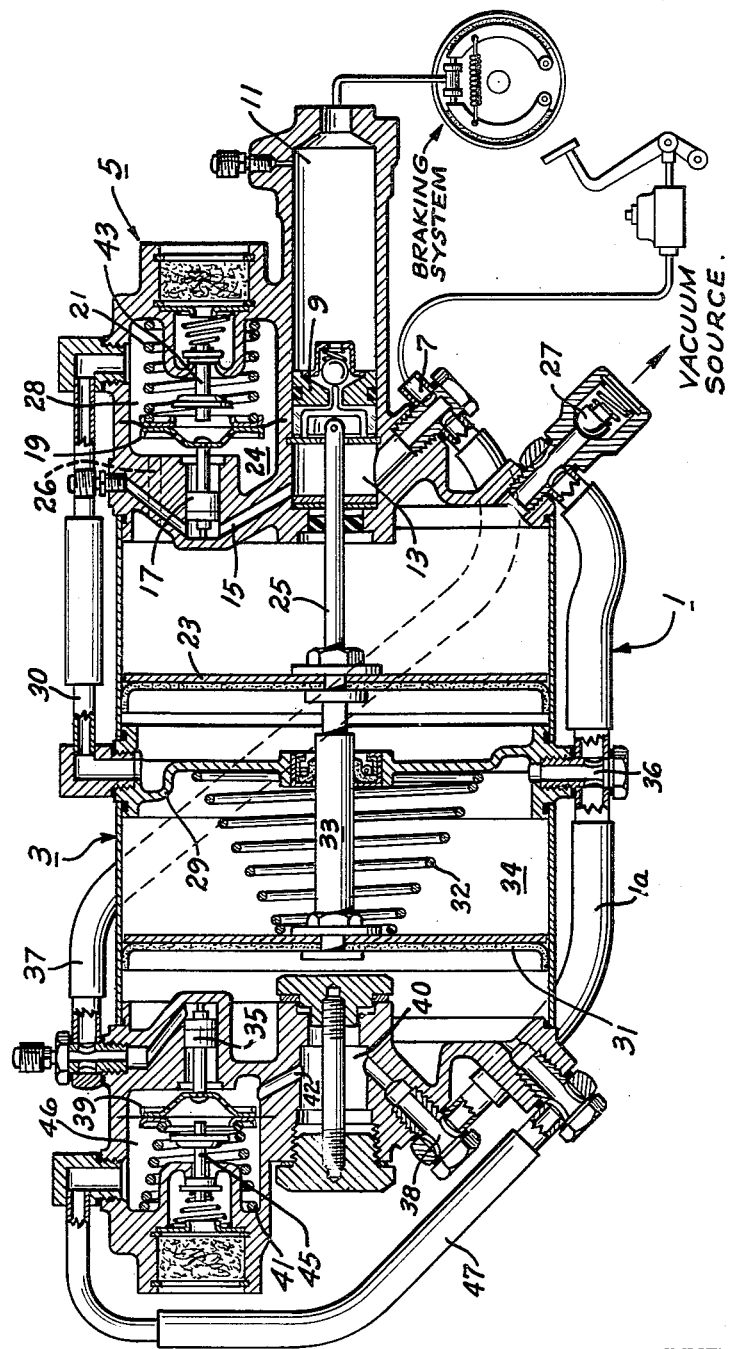
INVENTOR.
HANS SCHANZ.
BY
William P. Hickey
ATTORNEY.

United States Patent Office 3,083,694
Patented Apr. 2, 1963

3,083,694
FLUID PRESSURE SERVOMOTOR
Hans Schanz, Niederhochstadt, Taunus, Germany, assignor to Alfred Teves Maschinen- und Armaturenfabrik K.G., Frankfurt am Main, Germany, a corporation of Germany
Filed Feb. 18, 1959, Ser. No. 794,012
Claims priority, application Germany Feb. 21, 1958
6 Claims. (Cl. 121—38)

The present invention relates to fluid pressure servomotors and more particularly to combined differential air pressure servomotors and hydraulic master cylinders operated thereby of the type used in automotive braking systems which conventionally include hydraulic fluid pressure motor operated brake structures.

The combined units of the above type which are in current use comprise a servomotor in which a movable wall separates a first chamber communicating at all times with a constant pressure source (such as atmosphere or intake manifold of the vehicle engine) from a second chamber wherein the pressure is controlled by a driver operated control valve generally energized by hydraulic pressure from a primary, driver-operated master cylinder. Unless the valve is provided with additional elements, the unit presents a constant assistance rate from the "crack point" or, in other words, the amount of force delivered by the servomotor is in a constant rate with the pressure from the primary master cylinder.

In certain cases, it is advantageous to have a unit in which the rate of assistance increases at a first low rate for a predetermined range of control pressure, and at an increased rate for another range of control pressure: The primary object of the invention is to provide a fluid pressure servomotor wherein the rate of assistance is increased for a predetermined range of operating force.

A more specific object of the invention is to provide a power actuated hydraulic master cylinder wherein a plurality of servomotors are successively put into operation responsive to increasing values of a manually-controlled pressure.

Another specific object of the invention is to provide a power actuated hydraulic master cylinder provided with a pair of servomotors each having a control valve, one of said control valves being actuated responsive to low pressures from a drive-operated master cylinder while the other control valve has a delayed action resulting in the two servomotors cooperating only for a predetermined range of hydraulic control pressures.

It is still another object of the invention to provide a tandem-type air pressure operated unit comprising a pair of operatively connected servo-motors each having a control valve, said control valves being operated by the pressure in a common line and one at least of the valves having a return spring with a progressively increasing stiffness.

Other objects and advantages of the invention will be apparent from a consideration of the following description which refers to the annexed drawing which shows a longitudinal section of an embodiment of the invention.

In the drawing, numeral 1 designates the complete unit which is the combination of a secondary hydraulic master cylinder indicated generally at 3 and of servomotors indicated generally at 5. An inlet connection 7 communicates the secondary master cylinder with a primary, driver-operated master cylinder (not shown). A hydraulic piston 9 slidably received in the hydraulic cylinder separates a pressure chamber 11 from a follow-up chamber 13 in which the inlet opens. A passage 15 formed in the housing communicates the follow-up chamber with the rear face of a valve operating piston 17 adapted to cooperate with a valve seat providing diaphragm 19. For a complete description of the valve mechanism, reference may be had to Ringer U.S. Patent No. 2,598,604. Suffice it to say that piston 17 is biased toward its normal (inoperative) position by a return spring 21 compressed between the valve housing and diaphragm 19.

The primary servomotor has a power-actuated movable element which may be a pneumatic piston 23 connected to the hydraulic piston 9 by a push-rod 25. In the released position of the unit, communication is permitted between follow-up chamber 13 and pressure chamber 11 by a compensating valve, of the type described in the Ringer patent. When a force transmitted by the push-rod pushes the hydraulic piston forwardly, the compensating valve closes and separates the chambers.

The servomotor shown as an example is of the "vacuum suspended" type, wherein vacuum of equal intensity is normally present on both sides of the pneumatic piston: the front side of the piston 23 is, in constant communication with a chamber 24 of the control valve by means of passage 26, and is connected through a check valve 27 to a vacuum source. The valve control chamber 28 communicates with the rear side of piston 23 through conduit 30.

The secondary servomotor is located in the same housing as the primary servomotor, from which it is separated by a partition wall 29. The pneumatic piston 31 of the secondary servomotor is rigidly connected to the pneumatic piston 23 by means of a rod 33 which projects across the partition wall 29 through a vacuum seal. An external conduit $1a$ communicates vacuum to the front chamber 34 of the secondary servomotor by means of passage 36 and to the control valve associated therewith by means of conduit $1a$, and passages 38, 40 and 42. Its valve control member 46 communicates with the rear side of the piston 31 through conduit 47. At rest, a common return spring 32 compressed between pneumatic piston 31 and partition wall 29 maintains the tandem piston combination in the rearward position.

The two control valves are quite similar: The secondary control valve comprises a valve operating piston 35, the rear face of which is communicated to the common inlet connection 7 by a conduit 37. Piston 35 is connected to a valve seat providing diaphragm 39 biased toward normal position by a return spring 41. Initial compression of spring 41 is higher than initial compression of spring 21, so that the primary valve begins to operate to energize the primary servomotor at a lower hydraulic pressure than that for which the secondary valve becomes operative. Operation of the unit is as follows: the operator actuates the master cylinder (not shown) to develop a hydraulic pressure and as soon as the hydraulic force developed on the rear face of the piston 17 exceeds the initial compression of the return spring 21, the diaphragm is displaced from its rest position into engagement with the vacuum poppet of a valve head 43, thereby immediately cutting off communication between the two faces of pneumatic piston 23. Upon a further slight increase of the hydraulic force, the atmospheric poppet of valve head 43 is lifted from its seat whereby air is admitted against the rear face of the pneumatic piston to develop an actuating force. The tandem piston assembly and the hydraulic piston 9 move and the compensating valve closes as soon as the stroke initiates, thereby separating pressure chamber 11 from follow-up chamber 13. For a more complete description of the above recited operation, reference may be had to the above referred to Ringer Patent 2,598,604.

As long as the hydraulic force on piston 13 does not balance the initial compression of spring 41, the pneumatic piston 23 alone is operated and drags piston 31. For a given value of the inlet pressure, valve 45 is actuated open and the pneumatic pistons 23 and 31 cooperate for actuating the hydraulic piston.

When the driver wishes to relieve the braking force he has only to lessen the foot pressure on the master cylinder pedal: the fluid pressure decreases against the pistons 17 and 35 and the valve return springs cooperate with the pressure force on the diaphragms for moving backwards the movable assembly into a new balance position. Successively the secondary control valve and the primary control valve return into inoperative positions, responsive to lower and lower values of the hydraulic control pressure.

In order to achieve a more progressive change of the assistance rate, one or the other of the return springs may be formed so as to have a stiffness which increases with the amount of compression.

As a further refinement of the invention the first control valve may be rendered inoperative responsive to a violent application of the brakes from rest: under such conditions, the vacuum poppet of the valve head 43 traverses its complete stroke under the action of diaphragm 19 and closes the atmospheric valve seat, thereby preventing air from entering the rear chamber of the primary servomotor.

It will be apparent that the objects heretofore enumerated as well as others have been achieved; while the invention has been described in considerable detail, I do not wish to be limited to the particular construction shown and described: particularly it is obvious that means other than those described can be used for rendering the two valves operative for different values of the control pressure, as for instance valve actuating pistons with different diameters, etc. It is my intention to cover by the following claims all adaptations, modifications and changes in design which come within the practice of those skilled in the art to which the invention relates.

What I claim is:

1. In a braking system and the like having a driven member: a first servomotor having a power actuated member connected to said driven member; a first control element which increasingly power actuates said power actuated member as increased force is applied to said control element in an actuating direction; a second servomotor having a second power actuated member connected to said driven member; a second control element which increasingly power actuates said second power actuated member as increased force is applied to said second control element in an actuating direction; means for simultaneously applying actuating force to said first and second control elements; said second control element differing from said first control element in that a greater predetermined actuating force is required to actuate it than is required to actuate said first control element, and said second control element staying in its nonactuating position until after said first control element has at least partially actuated said first servomotor.

2. In a braking system and the like having a driven member: a first servomotor having a power actuated member connected to said driven member; a first control element which increasingly power actuates said power actuated member as increased force is applied to said control element in an actuating direction; first spring means opposing actuating movement of said first control element; a second servomotor having a second power actuated member connected to said driven member; a second control element which increasingly power actuates said second power actuated member as increased force is applied to said control element in an actuating direction; second spring means opposing actuating movement of said second control element; means for simultaneously applying actuating force to said first and second control elements; said second control element staying in its nonactuating position until after said first control element has at least partially actuated said first servomotor; and one of said spring means having a generally constant stiffness or spring rate while the other of said spring means has a changing stiffness or spring rate.

3. In a braking system and the like having a driven member: a first fluid pressure servomotor having a movable wall connected to said driven member; a first control valve actuating element which increasingly supplies differential pressure to said movable wall of said first servomotor as increased force is applied to said control element in an actuating direction; a second fluid pressure servomotor having a second movable wall connected to said driven member; a second control valve actuating element which increasingly supplies differential pressure to said second movable wall as increased force is applied to said control element in an actuating direction; means for simultaneously applying actuating force to said first and second control elements; said second control element differing from said first control element in that a greater predetermined actuating force is required to actuate it than is required to actuate said first control element, and said second control element staying in its nonactuating position until after said first control element has at least partially actuated said first servomotor.

4. In a braking system and the like having a driven member: a first fluid pressure servomotor having a movable wall connected to said driven member; a first control valve actuating element which increasingly supplies differential pressure to said movable wall of said first servomotor as increased force is applied to said control element in an actuating direction; first spring means opposing actuating movement of said first control element; a second fluid pressure servomotor having a second movable wall connected to said driven member; a second control valve actuating element which increasingly supplies differential pressure to said second movable wall as increased force is applied to said control element in an actuating direction; second spring means opposing actuating movement of said second control element; means for simultaneously applying actuating force to said first and second control elements, said second control element staying in its nonactuating position until after said first control element has at least partially actuated said first servomotor; and one of said spring means having a generally constant stiffness or spring rate while the other of said spring means has a changing stiffness or spring rate.

5. In a braking system and the like having a driven member: a first servomotor with a power chamber having a first movable wall therein dividing said power chamber into opposing chambers, a second servomotor with a power chamber having a second movable wall therein dividing said second power chamber into opposing chambers; each of said movable walls being connected to said driven member; a first constant pressure source in continuous communication with corresponding ones of said opposing chambers of said first and second servomotors; first and second control valves each having a control element which when in a normal position communicates said first constant pressure source to the other of said opposing power chambers of a respective one of said servomotors, and each of said control element when moved in an actuating direction communicating a different source of pressure to respective ones of said other opposing power chambers in a manner causing each of said movable walls to actuate said driven member; means for simultaneously applying actuating force to said first and second control elements, first and second biasing means urging respective control elements to their normal positions, said second biasing means exerting an initial force which holds said second element in its normal position until said first control element has been actuated, whereby said second servomotor is deenergized until said first servomotor is at least partially actuated.

6. In a braking system and the like having a driven member: a first servomotor with a power chamber having a first movable wall therein dividing said power chamber into opposing chambers, a second servomotor with a power chamber having a second movable wall therein dividing said second power chamber into opposing chambers; each of said movable walls being connected to said driven member; a first constant pressure source in continuous communication with corresponding ones of said opposing chambers of the first and second servomotors; first and second control valves each having a control element which when in a normal position communicates said first constant pressure source to the other of said opposing power chambers of a respective one of said servomotors, and each control element when moved in an actuating direction communicating a differing source of pressure to respective ones of said other opposing power chambers in a manner causing each of said movable walls to actuate said driven member; means for simultaneously applying actuating force to said first and second control elements, first and second spring means urging respective control elements to their normal positions, said second spring means exerting an initial force which holds said second element in its normal position until said first control element has been actuated and one of said spring means having a spring rate change as said control force increases; whereby said second servomotor is deenergized until said first servomotor is at least partially actuated.

References Cited in the file of this patent

UNITED STATES PATENTS

| | | |
|---|---|---|
| 2,393,524 | Fant | Jan. 22, 1946 |
| 2,404,932 | Stelzer | July 30, 1946 |
| 2,587,404 | Stelzer | Feb. 26, 1952 |
| 2,705,402 | Stelzer | Apr. 5, 1955 |
| 2,719,405 | Ringer | Oct. 4, 1955 |
| 2,797,665 | Chouings | July 2, 1957 |